United States Patent
Pellerin et al.

(10) Patent No.: US 12,372,045 B2
(45) Date of Patent: Jul. 29, 2025

(54) GUIDE ASSEMBLY FOR AN AIRCRAFT PROPULSION UNIT

(71) Applicant: SAFRAN NACELLES, Gonfreville-l'Orcher (FR)

(72) Inventors: Pierre Pellerin, Moissy-Cramayel (FR); Cedric François Pierre Renault, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/470,590

(22) Filed: Sep. 20, 2023

(65) Prior Publication Data

US 2024/0191673 A1 Jun. 13, 2024

(30) Foreign Application Priority Data

Sep. 22, 2022 (FR) ........................................ 2209611

(51) Int. Cl.
*F02K 1/72* (2006.01)
*B64D 29/06* (2006.01)

(52) U.S. Cl.
CPC ................ *F02K 1/72* (2013.01); *B64D 29/06* (2013.01)

(58) Field of Classification Search
CPC ..... F02K 1/72; F02K 1/70; F02K 1/80; B64D 29/06
See application file for complete search history.

(56) References Cited

U.S. PATENT DOCUMENTS

| | | | | |
|---|---|---|---|---|
| 9,783,315 B2 * | 10/2017 | James | ..................... | B64D 29/08 |
| 2014/0234090 A1 * | 8/2014 | Hurlin | ....................... | F02K 1/72 |
| | | | | 415/182.1 |
| 2018/0156131 A1 * | 6/2018 | Olson | ....................... | B64C 7/02 |
| 2021/0148244 A1 * | 5/2021 | Freeman | ................. | F01D 11/08 |
| 2023/0059782 A1 * | 2/2023 | Cazuc | ....................... | F02K 1/72 |

FOREIGN PATENT DOCUMENTS

| | | |
|---|---|---|
| EP | 0 055 163 A1 | 6/1982 |
| EP | 2 388 193 A2 | 11/2011 |
| EP | 3 228 854 A1 | 10/2017 |
| WO | 2014/072655 A1 | 5/2014 |
| WO | WO-2021156477 A1 * | 8/2021 ............... F02K 1/72 |

OTHER PUBLICATIONS

French Search Report and Written Opinion dated Apr. 13, 2023, issued in Application No. FR 2209611, filed Sep. 22, 2022, 6 pages total.

* cited by examiner

*Primary Examiner* — Andrew H Nguyen
(74) *Attorney, Agent, or Firm* — CHRISTENSEN O'CONNOR JOHNSON KINDNESS PLLC

(57) ABSTRACT

A guide assembly for an aircraft propulsion unit, the guide assembly having a first element and at least one guide element attached to the first element. The guide element includes a bottom wall, two lateral walls connected together by the bottom wall, and an opening defined between the bottom wall and the lateral walls. The opening is configured to receive at least partly a second element configured to move relative to the guide element. The guide element can further include at least one pair of gripping tongues cooperating with holding members of the first element to retain the guide element on the first element.

17 Claims, 9 Drawing Sheets

GUIDE ASSEMBLY FOR AN AIRCRAFT PROPULSION UNIT

CROSS-REFERENCE TO RELATED APPLICATION

This application claims priority to FR2209611, filed Sep. 22, 2022, the disclosure of which is hereby expressly incorporated by reference herein in its entirety.

TECHNICAL FIELD

This disclosure relates to the field of the propulsion units for an aircraft. Embodiments of the present disclosure relate to a guide assembly for an aircraft propulsion unit. The present disclosure also relates to a thrust reverser for a nacelle of an aircraft propulsion unit comprising guide assemblies according to embodiments of the present disclosure, and a method for assembling the guide assemblies.

BACKGROUND

The prior art comprises documents EP-A1-0 055 163, EP-A1-3 228 854 and EP-A2-2 388 193.

Propulsion units for aircraft include a turbomachine-type engine surrounded by a nacelle.

The nacelle generally has a tubular structure comprising an air inlet upstream of the turbomachine, a middle section designed to surround a fan of the turbomachine, a downstream section incorporating thrust reversing means and designed to surround a combustion chamber of the turbomachine and is generally terminated by an ejection nozzle whose outlet is located downstream of the turbomachine.

It is known that the nacelle can be designed to house a double flow turbomachine capable of generating, by means of rotating vanes of the fan, a flow of hot air (otherwise referred to as primary flow) and a flow of cold air (otherwise referred to as secondary flow). This flow of cold air circulates outside the turbomachine through an annular duct formed between a fairing of the turbomachine and an internal wall of the nacelle. These two flows, hot and cold, are ejected from the turbomachine through the rear of the nacelle.

A thrust reverser is fitted in the downstream section of the nacelle.

The role of a thrust reverser is, when an aircraft lands, to improve its braking capacity by redirecting forward at least a portion of the thrust generated by the turbomachine. In this phase, the reverser obstructs at least a portion of the duct of the cold flow and directs this flow towards the front of the nacelle, thereby generating a counter-thrust in addition to the braking of the wheels of the aircraft.

The means used to direct the cold flow vary according to the type of thrust reverser. A common thrust reverser structure comprises a cowl in which an opening is provided for the diverted flow which, in a thrust reversal situation, is released by translational movement downstream (with reference to the orientation of the flow of the gases in the propulsion unit), by means of cylinders for moving the cowl.

This sliding cowl can be formed by two half-cowls, substantially semi-cylindrical in shape, which are hinged at the upper portion (at 12 o'clock, by analogy with the dial of a clock) on hinges parallel to the direction of translation of the sliding cowl, and which are closed by latches at the lower portion (at 6 o'clock).

This arrangement allows access to the interior of the nacelle for maintenance operations, and to the turbomachine or to an internal structure of the thrust reverser, by opening these half-cowls.

Another possible thrust reversal structure comprises a single-piece external cowl without a break at the lower portion. Such a structure is referred to as an O-shaped structure.

The displacement cylinders can be mounted on a front frame of the cowl upstream of the opening. This cowl of the nacelle, referred to as the external cowl, is stationary. The front frame moves relative to the stationary cowl along a guide assembly.

FIG. 1 illustrates an example of this guide assembly 9 for moving, by translation, a first element 6 of the thrust reverser of the nacelle 1 (forming a guided element) relative to a second element 7 of the thrust reverser (forming a guiding element). The first element 6 may be a stationary beam of the front frame 52. The second element 7 may be a slider of the external cowl 5.

The guide assembly 9 also comprises at least one guide element 8. This guide element 8 may be a rail or a guide track.

As shown in FIG. 1, the guide element 8 is attached on the first element 6. For example, the guide element 8 is assembled by sliding from rear to front (relative to the direction of gas flow in the propulsion unit), in a guide housing 60 in the first element 6.

With reference to FIGS. 2, 3A and 3B, the guide element 8 has a generally elongated shape along a longitudinal axis A between a first longitudinal end 81 and a second longitudinal end 82.

This guide element 8 comprises:
a bottom wall 83;
two lateral walls 84, 85 connected between them by the bottom wall 83; and
an opening 86 defined between the bottom wall 83 and the lateral walls 84, 85.

The opening 86 can accommodate at least partly the second element 7. This second element 7 is thus able to move in this opening 86.

The guide element 8 is currently retained, on the one hand, by a fastening device 90 located upstream of the guide element 8 (namely on the first longitudinal end 81), and on the other hand, by a friction-type contact segment between the guide element 8 and the first element 6. This friction at the interface between the guide element 8 and the first element 6 can lead to rubbing during their assembly (for example, assembly of the first element 6 by force) and/or disassembly (for example, dissociation of the parts 6, 8 by pulling) which can damage these parts 6, 8, and protective coatings which may be applied on these parts 6, 8.

In addition, the frictional contact between the guide element 8 (via the lateral walls 84, 85 of the guide element) and the first element 6 may have a variable coefficient of friction which may restrict the retention of the guide element 8 within the first element.

In this context, it is interesting to overcome the disadvantages of the prior art, by proposing a guide assembly (comprising the first element and the guide element) that is robust and easy to assemble and/or disassemble in an aircraft propulsion unit.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present disclosure, a guide assembly for an aircraft propulsion unit is provided. The guide assembly includes a first element and at least one guide element attached to the first element, the guide element having a generally elongate shape along a longitudinal axis between a first longitudinal end and a second longitudinal end, the guide element including:
- a bottom wall;
- two lateral walls connected by the bottom wall; and
- an opening defined between the bottom wall and the lateral walls, the opening being designed to receive at least partly a second element configured to move relative to the guide element.

According to the disclosure, the guide element further comprises at least one pair of gripping tongues cooperating with holding members of the first element to retain the guide element on the first element.

The inclusion of at least one pair of gripping tongues generally allows to improve the retention of the guide element on the first element. In some embodiments, when the guide element is installed on the first element, each tongue is in abutment with the corresponding holding member of the first element. Unlike the frictional contact between the guide element and the first element in the prior art, the abutment between the pair of gripping tongues and the holding members allows to make it easier and more effective to stop the movement of the guide element installed in the first element.

In addition, the absence of friction between the guide element (in some embodiments at the level of the lateral walls) and the first element in the configuration of the disclosure allows to reduce the risk of damage to the parts (i.e., the guide element and the first element) during their assembly and/or disassembly. By simply bringing the tongues closer, the guide element (e.g., the pair of tongues and the lateral walls) can be elastically deformed so that it can be inserted (for example by translation) into a guide housing in the first element. This allows elimination of the friction when installing and de-installing these parts. In this way, the pair of gripping tongues allows to make it easier to assemble and disassemble the guide element on the first element.

The disclosure therefore has the advantage of offering a simple design with high reliability and low cost and overall dimension for the guide assembly in an aircraft propulsion unit.

The guide assembly according to the disclosure may comprise one or more of the following characteristics, taken in isolation from each other or in comparison with each other:
- the guide assembly comprises holding members of the first element;
- the pair of gripping tongues extends substantially in a plane parallel or perpendicular to the longitudinal axis A;
- the tongues of the pair of gripping tongues and the walls are elastically deformable between a first position, in which the tongues and the walls are brought together, and a second position, in which the tongues cooperate with the holding members to retain the guide element on the first element;
- the at least one pair of gripping tongues extend outwardly from a free end of the lateral walls;
- the guide assembly comprises a number of pairs of gripping tongues evenly spaced along the axis longitudinal A;
- the holding members are grooves, each groove receiving one tongue of the pair of tongues for gripping the guide element;
- the holding members are recesses or chamfers, each recess or each chamfer receiving one tongue of the pair of tongues for gripping the guide element;
- the guide assembly further comprises at least one fastening device at at least one of the first and second longitudinal ends of the guide element and/or on the at least one pair of gripping tongues, the fastening device being intended to secure the guide element to the first element;
- the first element comprises at least one pair of bearing surfaces complementary to the corresponding bearing faces of the pair of gripping tongues;
- the bearing faces have a flat or curved shape;
- the guide element is a rail;
- the first element is a slider;
- the guide assembly comprises the second element which is assembled at least partly in the opening of the guide element so that the second element moves relative to the guide element;
- the second element is a stationary beam;
- each groove has a shape complementary to or substantially the same as that of the corresponding tongue of the pair of gripping tongues;
- the pair of gripping tongues is integral with the lateral walls;
- each tongue of the pair of gripping tongues comprises at least one flat or L-shaped curved segment;
- the guide assembly comprises at least one fastening device configured to attach the guide element to the first element;
- the fastening device comprises a screw, a wedge and a shouldered ring interposed between a head of the screw and the wedge;
- each tongue of the pair of gripping tongues has a length measured along the axis A, this length being between 3 and 10 cm for a total length of 100 cm of the guide element;
- the length of each tongue is between 4 and 5 cm for a total length of 100 cm of the guide element;
- each tongue of the pair of gripping tongues has a width measured with respect to a plane perpendicular to the axis A, this width is between 30% and 70% with respect to a total width of the bottom wall; and
- the width of each tongue is between 7 and 18 mm for a total width of 25 mm of the bottom wall.

The present disclosure also relates to a thrust reverser for a nacelle of an aircraft propulsion unit, the thrust reverser comprising at least one external cowl that can move between a position referred to as the thrust reverser closed position and a position referred to as the thrust reverser open position, and a front frame, in which the external cowl is mounted so that it can move in translation along at least one guide assembly according to one or more embodiments of the present disclosure.

The first element of the guide assembly may be secured to the front frame of the thrust reverser.

The second element can be secured to the external cowl of the thrust reverser.

The present disclosure may also relate to a propulsion unit for an aircraft, comprising at least one guide assembly according to one or more embodiments of the present disclosure or a thrust reverser according to the disclosure.

The present disclosure also relates to a method for assembling at least one guide assembly according to embodiments of the present disclosure. The method comprises the steps of:
providing the first element and the at least one guide element;
compressing the gripping tongues on the guide element;
translating the guide element in a guide housing of the first element along the longitudinal axis A; and
releasing the gripping tongues so that each tongue of the at least one pair of gripping tongues cooperates in abutment with the corresponding holding member to retain the guide element on the first element.

The step of releasing the gripping tongues allows the pair of gripping tongues and the lateral walls (and therefore the assembly of the guide element) to return to their original shape before compression. The assembly method may further comprise adding at least one fastening device to at least one of the first and second longitudinal ends of the guide element and/or to the at least one pair of gripping tongues after the step of releasing the gripping tongues.

Advantageously, the assembly method comprises a further step of inserting a second element at least partly into the opening of the guide element, for example by translation.

The steps of compressing the gripping tongues, translating the guide element, and releasing the gripping tongues can be carried out using a suitable tooling, this tooling being chosen from knob and circlip pliers.

Each tongue of the pair of gripping tongues may comprise at least one orifice, the tooling being configured to be removably attached in that orifice to compress and/or release the pair of gripping tongues relative to one another.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

The elements having the same functions in the different embodiments have the same reference numerals in the FIGURES.

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

By convention, in the following description, the terms "longitudinal" and "axial" refer to the orientation of structural elements extending in the direction of a longitudinal axis, such as a longitudinal axis of the engine of a turbomachine. The terms "radial" or "vertical" refer to an orientation of structural elements extending along a direction perpendicular to the longitudinal axis. The terms "inner" and "outer", and "internal" and "external" are used in reference to a positioning with respect to the longitudinal axis. Thus, a structural element extending along the longitudinal axis comprises an inner face facing the longitudinal axis and an outer surface opposite its inner surface.

Similarly, by convention in this application, the terms "upstream" and "downstream" are defined in relation to the flow orientation of the gases in the turbomachine of an aircraft propulsion unit.

FIGS. 1, 2, 3A and 3B have been described above and illustrate a guide element 8 and a guide assembly 9 according to the prior art.

Figure 4:
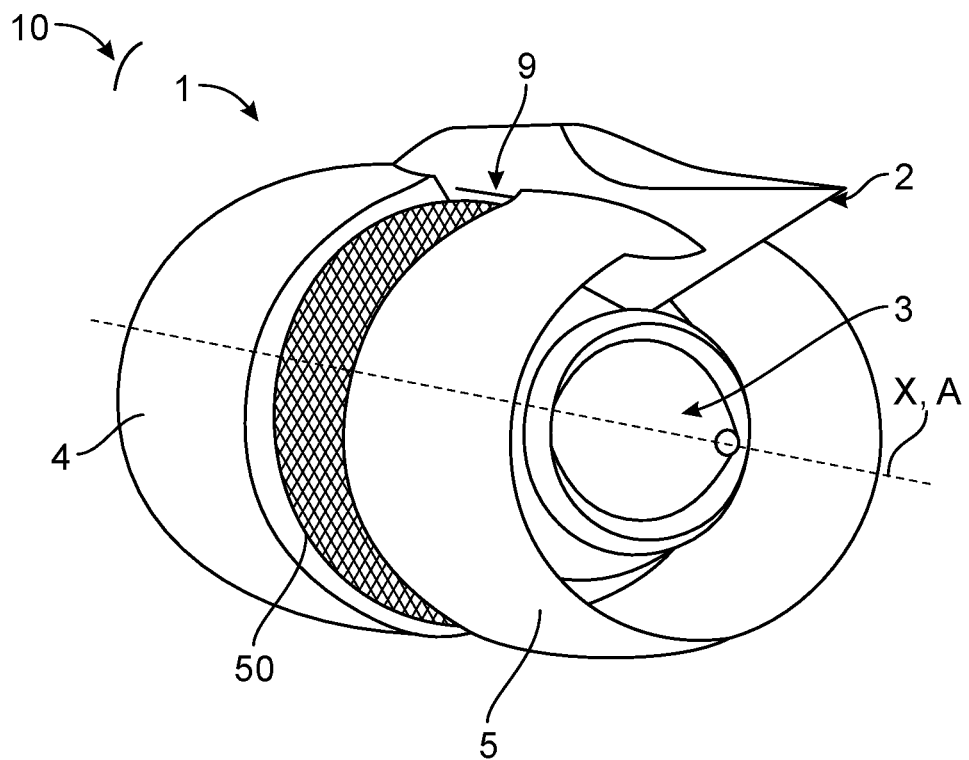
FIG. 4 is a schematic perspective view of a nacelle of an aircraft propulsion unit comprising a thrust reverser in the open position with a guide assembly in accordance with aspects of the present disclosure.

The disclosure applies in a non-limiting way to an aircraft propulsion unit 10. FIG. 4 illustrates this aircraft propulsion unit 10 comprising a turbomachine 3 which is surrounded by a nacelle 1.

The aircraft propulsion unit 10 can be suspended from a stationary structure of an aircraft, for example under a wing or on a fuselage, by means of a pylon 2 (or mast) attached to the turbomachine 3 or to the nacelle 1 in the case of the example shown in FIG. 4.

The turbomachine 3 can be a double flow engine comprising, from upstream to downstream (in the flow direction of the gases), a fan, a low-pressure compressor, a high-pressure compressor, an annular combustion chamber, a high-pressure turbine and a low-pressure turbine, which define a flow duct for a primary air flow (referred to as hot air flow).

The nacelle 1 extends along a longitudinal axis X coincident with the longitudinal axis of the turbomachine 3.

The nacelle 1 may comprise, from upstream to downstream, an upstream air inlet section 4, a median section (not visible in FIG. 4), a downstream section housing a thrust reverser and possibly a terminal nozzle section. The sections of the nacelle are connected together so as to extend around the turbomachine 3 and define an annular flow duct around it for a flow of secondary air (or cold air flow).

Figure 5:
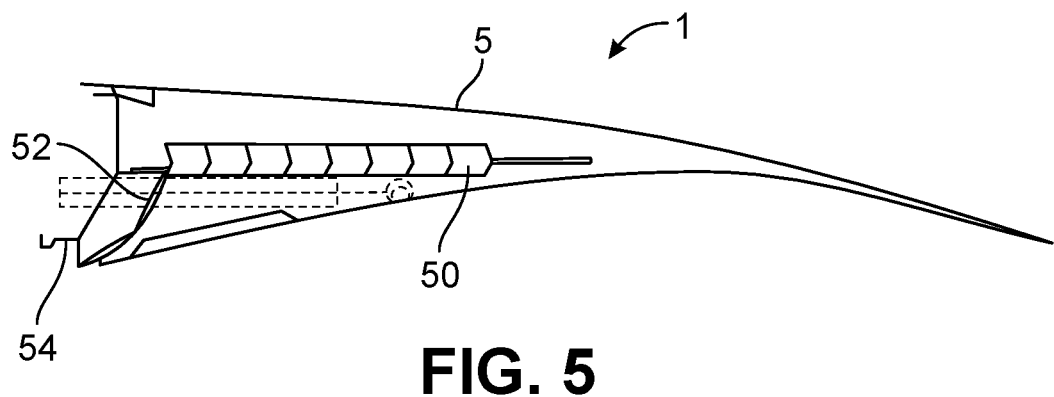
FIG. 5 is a schematic axial sectional view of the thrust reverser in FIG. 4.

The thrust reverser comprises an external cowl 5 and a front frame 52. The thrust reverser may comprise deviation members 50 for diverting an air flow (e.g., the cold air flow). These deviation members 50 may be movably connected to the external cowl 5 (not shown in the figures) or the deviation members 50 may be fixedly connected to the front frame 52 (FIG. 5).

The external cowl 5 is in a single part, an O-shaped structure in the example shown. The external cowl 5 can be moved between a position referred to as closed position and a position referred to as open position. The closed position of the thrust reverser (not shown) is a position in which the external cowl ensures the external aerodynamic continuity of the nacelle with the upstream and median sections. In this way, the external cowl 5 can cover the deviation members 50.

In FIG. 4, the thrust reverser is shown in the open position, in which the external cowl 5 of the downstream section is deployed downstream of the nacelle 1 so as to leave an opening in the external structure of the nacelle and uncover the deviation members 50.

The deviation members 50 may be in the form of grids. These deviation members 50 are supported by the front frame 52.

In the example, the front frame 52 closes the nacelle upstream of the external cowl 5 and is intended to be mechanically connected to a casing of the fan of the turbomachine by connection means 54. These connection means 54 can be detached from the casing of the fan.

As described above, the external cowl 5 moves relative to the stationary front frame 52 along a guide assembly 9. To achieve this, the front frame 52 may comprise a first element 6, such as a stationary beam, and the external cowl 5 may comprise a second element 7, such as a movable part. This movable part may be a slider.

The first element 6 allows to form a stationary element able to receive a guide element 8, and the second element 7 allows to form a movable element able to move along the guide element 8.

The guide assembly 9 therefore comprises the first element 6 and at least one guide element 8.

The guide element 8 is designed to be attached to the first element 6.

The guide element 8 has a generally elongated shape along a longitudinal axis A. This axis A may be coincident with axis X. The guide element 8 extends between a first longitudinal end 81 and a second longitudinal end 82.

The guide element 8 can be a rail (also referred to as trackliner). The guide element 8 may be elastically deformable. The guide element 8 may have a substantially omega "Q" shape.

The guide element 8 comprises:
a bottom wall 83;
two lateral walls 84, 85, referred to as first wall 84 and second wall 85, connected by the bottom wall 83; and
an opening 86 defined between the bottom wall 83 and the first and second lateral walls 84, 85.

Each of the first and second lateral walls 84, 85 can be curved, with a concave portion of each of the first and second lateral walls 84, 85 facing, in some embodiments, towards the opening 86. In the examples shown in FIGS. 6, 8, 9 to 11, the first and second lateral walls 84, 85 are symmetrical to each other through a median plane of symmetry B. This plane B is substantially perpendicular to the axis A.

Each of the first and second lateral walls 84, 85 has a free end 840, 850 respectively. These free ends 840, 850 can extend along the axis A. In the examples shown in FIGS. 6, 8, 9 and 13, the free ends 840, 850 are separated from each other symmetrically with respect to the plane B.

The opening 86 is designed to receive at least partly the second element 7. This second element 7 is thus able to move by translation along the axis A, in this opening 86.

The bottom wall 83, the first and second lateral walls 84, 85, and the opening 86 can extend along the axis A.

The bottom wall 83 and the first and second lateral walls 84, 85 can be formed in a single piece (i.e., from one piece).

In some embodiments, the guide element 8 also comprises at least one pair of gripping tongues 80. This pair of gripping tongues 80 helps to retain the guide element 8 on the first element 6. In addition, the pair of gripping tongues allows to make it easier to assemble and/or disassemble the guide element 8 in the first element 6 by elastically deforming the guide element 8 at the level of the pair of gripping tongues 80. This elastic deformation can be carried out by compressing (or bringing together) the two tongues of the pair of gripping tongues 80. The guide element 8 can be elastically deformed for a short time, i.e. the time required to install and/or uninstall the guide element 8 on the first element 6. The guide element 8 the pair of gripping tongues 80, can return to its original shape after installation.

It should be noted that compression of the tongues also causes elastic deformation of the first and second walls 84, 85. These walls 84, 85 (and the pair of gripping tongues 80) can thus be deformed into a first position, referred to as the compression position, in which the walls 84, 85 are brought closer together to allow the guide element 8 to move (e.g., by translation) in the guide housing 60 of the first element 6. The walls 84, 85 (and the pair of gripping tongues 80) can also assume a second position, referred to as the rest position, in which the walls 84, 85 return to their initial shapes. In this second position, the tongues 80 cooperate with the holding members 62 so that the guide element 8 is held firmly on the first element 6.

In some embodiments, the pair of gripping tongues 80 extend outwards (relative to the axis A) from a respective free end 840, 850 of the first and second lateral walls 84, 85. This configuration is illustrated in FIGS. 6 and 8 to 15. Alternatively, not shown, the pair of gripping tongues 80 extend inwardly (relative to the axis A) from the free ends 840, 850.

The pair of gripping tongues 80 may be integral with the first and second lateral walls 84, 85. In other words, the pair of gripping tongues 80 and the first and second lateral walls 84, 85 can be formed as a single piece (or in other words as monobloc).

The pair of gripping tongues 80 may extend substantially in a plane parallel to the axis A (as illustrated in FIGS. 6, 8, 9, 13A, 13B, 14 and 15) and/or in a plane perpendicular to the axis A (as illustrated in FIGS. 10, 11, 12A and 12B).

Each gripping tongue 80 may comprise at least one flat segment (as illustrated in FIGS. 10, 11, 12A and 12B) or at least one L-shaped curved segment (as illustrated in FIGS. 6, 8, 9, 13A, 13B, 14 and 15).

The guide element 8 may comprise one or more pairs of gripping tongues 80.

When the guide element 8 comprises a pair of gripping tongues 80, this pair of tongues is preferably located at the level of a median segment of the guide element 8 between the first and second longitudinal ends 81, 82.

When the guide element 8 comprises several pairs of gripping tongues 80, these pairs of tongues are preferably distributed evenly along the axis A. For example, at least one pair of gripping tongues 80 is located upstream of the guide element 8 at the level of the first longitudinal end 81, and at least one pair of gripping tongues 80 is located downstream at the level of the second longitudinal end 82.

Each gripping tongue 80 may have a first length $L_{80}$ (FIG. 13A) which is measured along the axis A. This first length $L_{80}$ can vary according to the size referred to as gripping size (for example of the hole or holes 87 described below) required to compress the pair of tongues during installation and/or de-installation of the guide element. For example, the first length $L_{80}$ is between 3 and 10 cm for a total length of the guide element of 100 cm. Preferably, the first length $L_{80}$ is between 4 and 5 cm for a total length of the guide element of 100 cm. In some embodiments, this allows to reduce the overall dimension of the pair of gripping tongues in the guide assembly 9.

When the pair of gripping tongues 80 extends substantially in the plane parallel to the axis A, each gripping tongue 80 may have a first width $l_{80}$ which is measured with respect to a plane transverse to the axis A. This first width $l_{80}$ may be between 30 and 70% relative to a total width 183 of the bottom wall 83. For example, the first width $l_{80}$ is between 7 and 18 mm for a total width 183 of 25 mm.

In some embodiments, the pair of gripping tongues 80 is made from a material identical to that of the guide element 8.

By way of example, the pair of gripping tongues 80 is made of metal (such as aluminium), composite or thermoplastic.

FIGS. 6 to 15a and 15b show several embodiments of the guide assembly 9, and the guide element 8 and the second element 6 of the disclosure.

In some embodiments of the present disclosure, the first element 6 comprises holding members 62. These holding members 62 are configured to receive a corresponding tongue 80 from the pair of gripping tongues 80. These holding members 62 also help to retain the guide element 8 on the first element 6.

Each holding member 62 may have a shape complementary or substantially similar to that of the corresponding tongue of the pair of gripping tongues 80.

Figure 10:
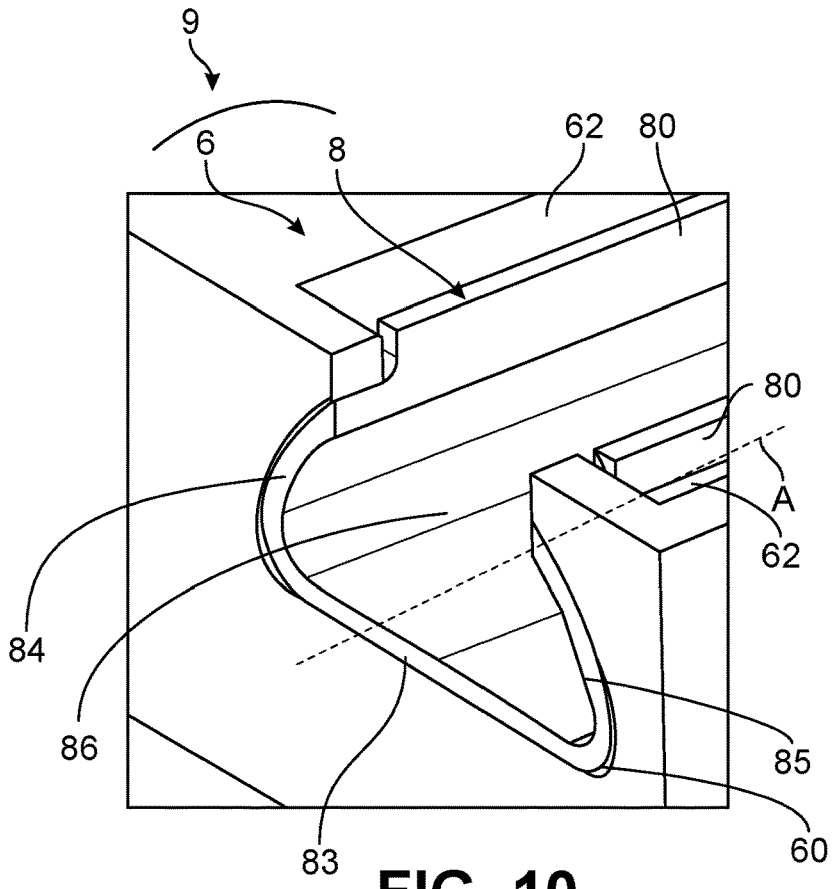
FIG. 10 is a schematic partial perspective view of the guide assembly of FIG. 4 according to a third embodiment of the present disclosure, the guide assembly comprising a second element according to a first variant.
Figure 11:
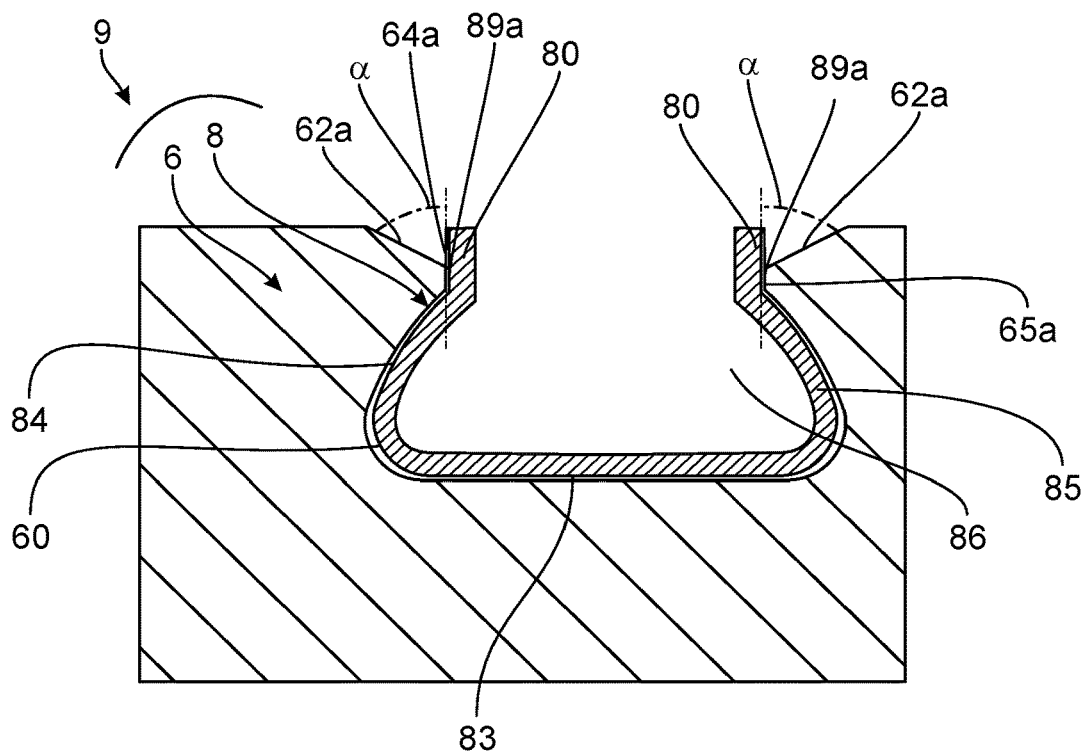
FIG. 11 is a partial schematic cross-sectional view of the guide assembly of FIG. 10 comprising a second element according to a second variant.

These holding members 62 may be grooves (FIGS. 6 to 9), recesses (FIG. 10) or chamfers (FIG. 11).

Figure 7:
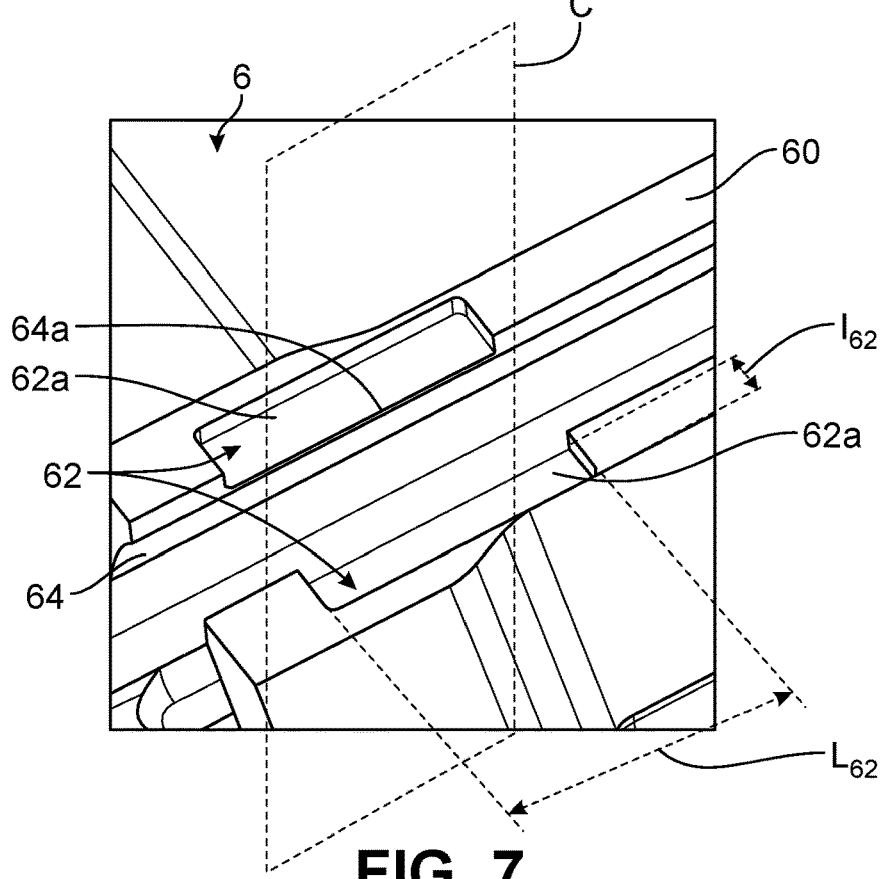
FIG. 7 is a schematic partial perspective view of a first element of the guide assembly of FIG. 6.

With reference to FIG. 7, these holding members 62 can be arranged in pairs of holding members 62 in the guide assembly 9, in a similar way to the pair of gripping tongues 80. Thus, two holding members 62 of a pair of holding members 62 are symmetrical with respect to each other by a median plane of symmetry C. This plane C is substantially perpendicular to the axis A.

In some embodiments, the guide assembly 9 also comprises the second element 7.

As described above, the second element 7 can be assembled at least partly in the opening 86 of the guide element 8. In this way, the second element 7 is configured to move by translation along the guide element 8.

Figure 6:
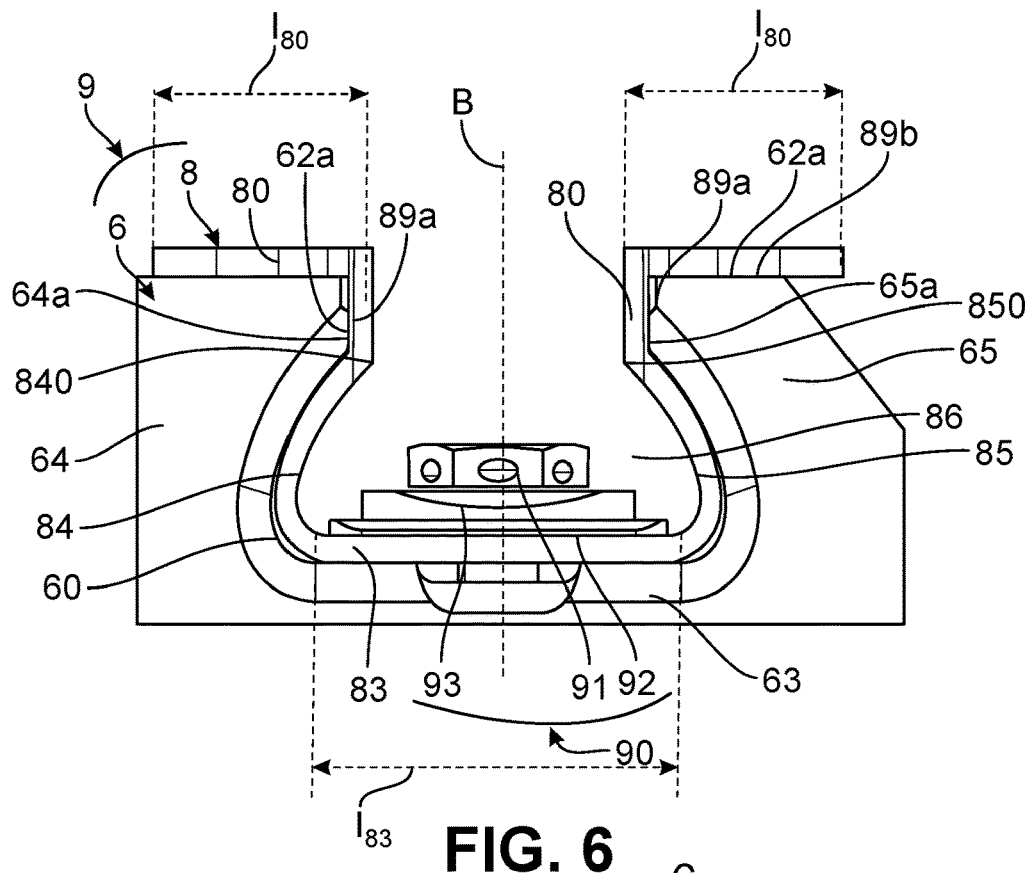
FIG. 6 is a schematic partial front view of the guide assembly of FIG. 4 according to a first embodiment of the present disclosure, the guide assembly comprising a guide element according to a first variant.
Figure 8:
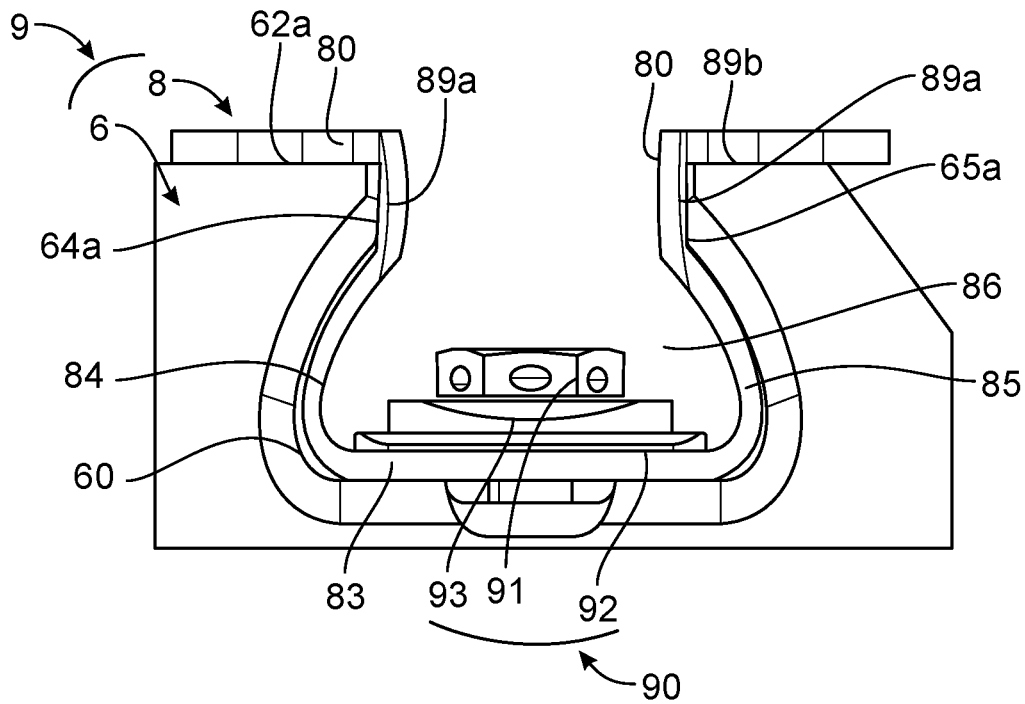
FIG. 8 is a schematic partial front view of the guide assembly of FIG. 6 comprising a guide element according to a second variant.

FIGS. 6 to 8 illustrate a first embodiment of the guide assembly 9 for retaining the guide element 8 on the first element 6.

The guide assembly 9 of the first embodiment comprises the first element 6 and at least one guide element 8 as described above.

The first element 6 can be secured to the front frame 52. For example, the first element 6 is the stationary beam (shown in FIG. 1). This first element 6 may comprise a guide housing 60, for example a longitudinal slot along a longitudinal axis which is parallel to axis A.

The guide housing 60 can be defined between third and fourth lateral walls 64, 65 and a bottom 63 of the first element 6. The third and fourth lateral walls 64, 65 are connected by the bottom 63.

The holding members 62 of the guide assembly 9 of the first embodiment are grooves. Each groove is configured to receive a corresponding tongue from the pair of gripping tongues 80.

The grooves are formed on an external surface of the third and fourth lateral walls 64, 65.

Each groove may comprise a first bearing surface 62a. This first bearing surface 62a extends substantially in a plane parallel to the guide housing 60 (or to the axis A).

The third and fourth lateral walls 64, 65 may each comprise at least one second bearing surface 64a, 65a. These second bearing surfaces 64a, 65a extend substantially in a plane perpendicular to the guide housing 60 (or to the axis A).

One of the second bearing surfaces 64a, 65a extends from one of the corresponding free ends 840, 850 of the third and fourth lateral walls 84, 85, and the first bearing surface 62a extends from this corresponding second bearing surface 64a, 65a.

FIG. 7 shows grooves that each extend in a plane parallel to the guide housing 60.

In the example shown in FIG. 7, the grooves are symmetrical to each other in the plane C.

Each groove may have a second length $L_{62}$ (measured with respect to a plane transverse to the plane C or with respect to the axis A). This second length $L_{62}$ may be identical to the first length $L_{80}$.

Each groove 62 may have a second width 162 (measured with respect to a plane perpendicular to the plane C or with respect to a plane transverse to the axis A). This second width $l_{80}$ can be identical to the first width 180.

In the illustrated embodiment of the guide element 8 in FIG. 6, the pair of gripping tongues 80 extends substantially in a plane parallel to the axis A.

Each gripping tongue 80 comprises an L-shaped curved segment. This L-shaped curved segment may comprise a first bearing face 89a which extends substantially in a plane perpendicular to the axis A, and a second bearing face 89b which extends substantially in a plane parallel to the axis A.

The first bearing face 89a can extend from one of the free ends 840, 850 of the lateral walls 84, 85, and the second bearing face 89a extends from this first bearing face 89a. In the example shown in FIG. 6, the first and second bearing faces 89a, 89b are flat.

When the guide element 8 is installed on the second element 6, the first bearing face 89a is configured to abut against the corresponding second bearing surface 64a, 65a, and the second bearing face 89b is configured to abut against the corresponding first bearing surface 62a.

FIG. 8 illustrates a variant of the guide element 8 of FIG. 6, in which the first bearing faces 89a of the pair of gripping tongues 80 have a curved shape. This curved shape allows to reinforce the contact at the level of the interface between the first bearing faces 89a and the second bearing surfaces 64a, 65a in the event of rotational movement of the guide assembly 9 in operation.

In this example of FIG. 8, the curved shape of the first bearing faces 89a comprises a concave portion oriented towards the second bearing surfaces 64a, 65a.

As an alternative embodiment (not illustrated) to FIG. 8, the second bearing surfaces 64a, 65a of the second element 6 also have a curved shape, preferably complementary to that of the first bearing faces 89a of the pair of gripping tongues 80.

In the examples shown in FIGS. 6 and 8, the two gripping tongues 80 of the pair of gripping tongues 80 have the same second width 180. The second width$_{180}$ of each gripping tongue 80 can vary according to the gripping size (of the turn or turns 87) required to compress the pair of tongues during installation and/or de-installation of the guide element, and/or the size referred to as attaching size of a fastening device 90 (described below).

In other embodiments of the guide assembly 9 of the first embodiment, the guide assembly 9 also comprises at least one fastening device 90.

Figure 1:
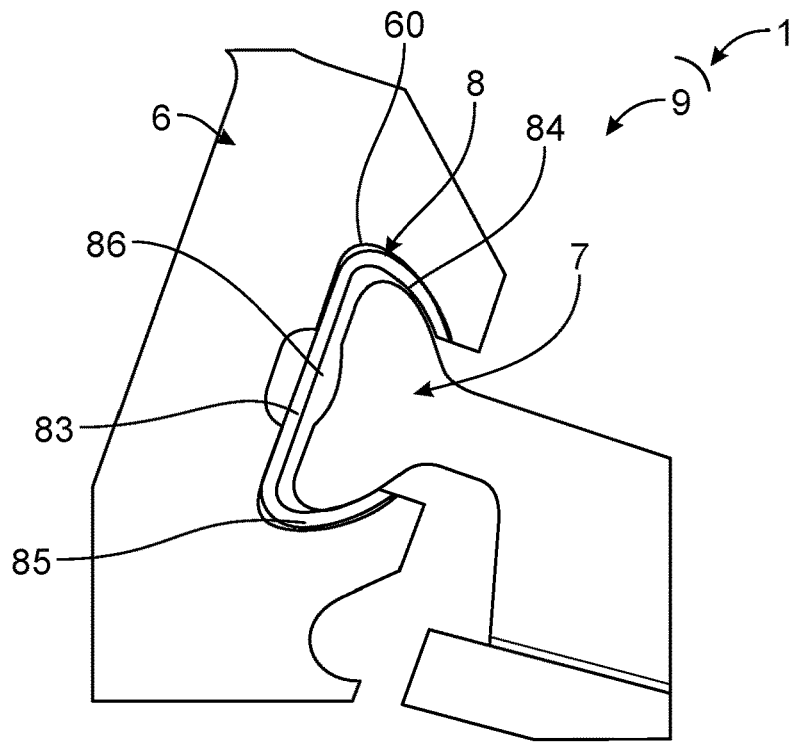
FIG. 1 is a partial schematic view in axial cross-section of a guide assembly according to the prior art.
Figure 2:
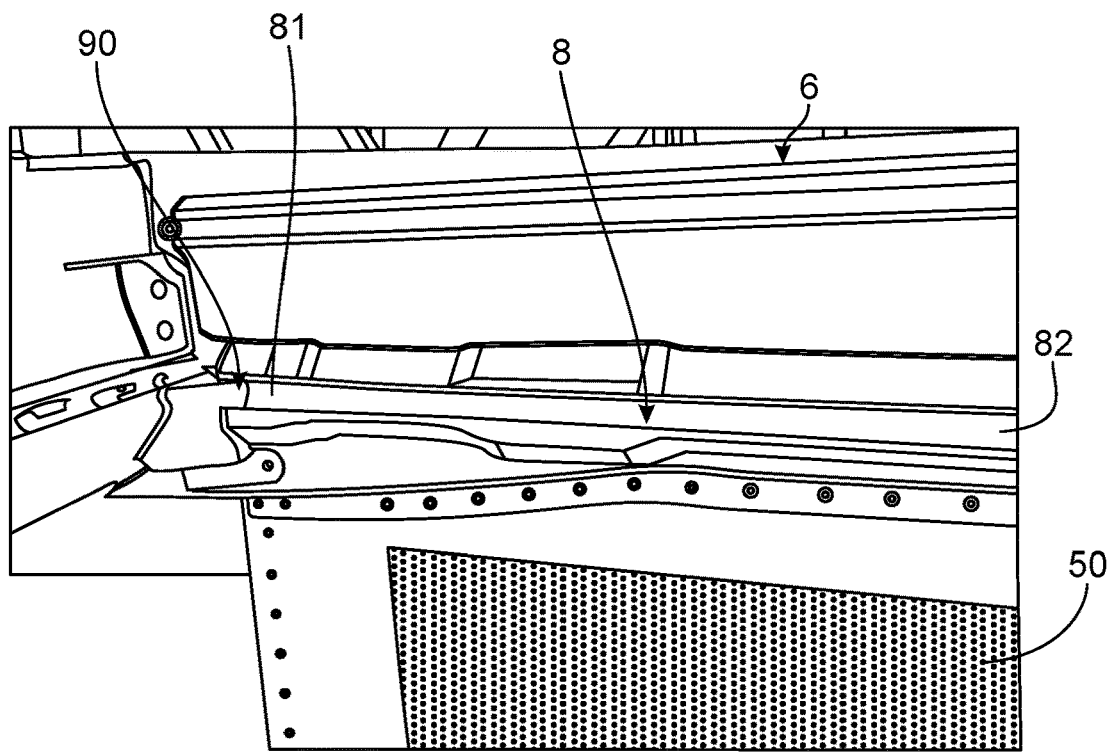
FIG. 2 is a schematic perspective view of a guide element of the guide assembly of FIG. 1.
Figure 3A:
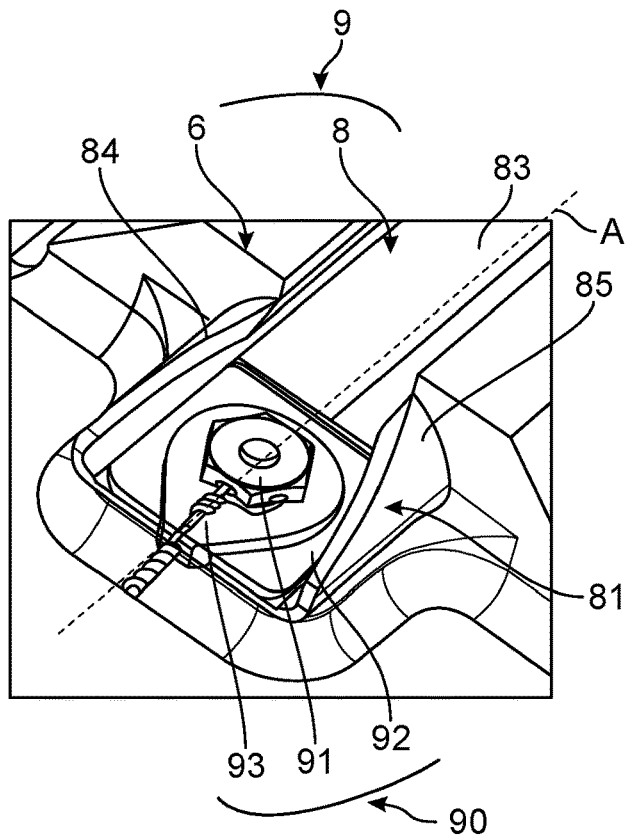
FIG. 3A is a schematic partial perspective view of the guide assembly shown in FIG. 1.
Figure 3B:
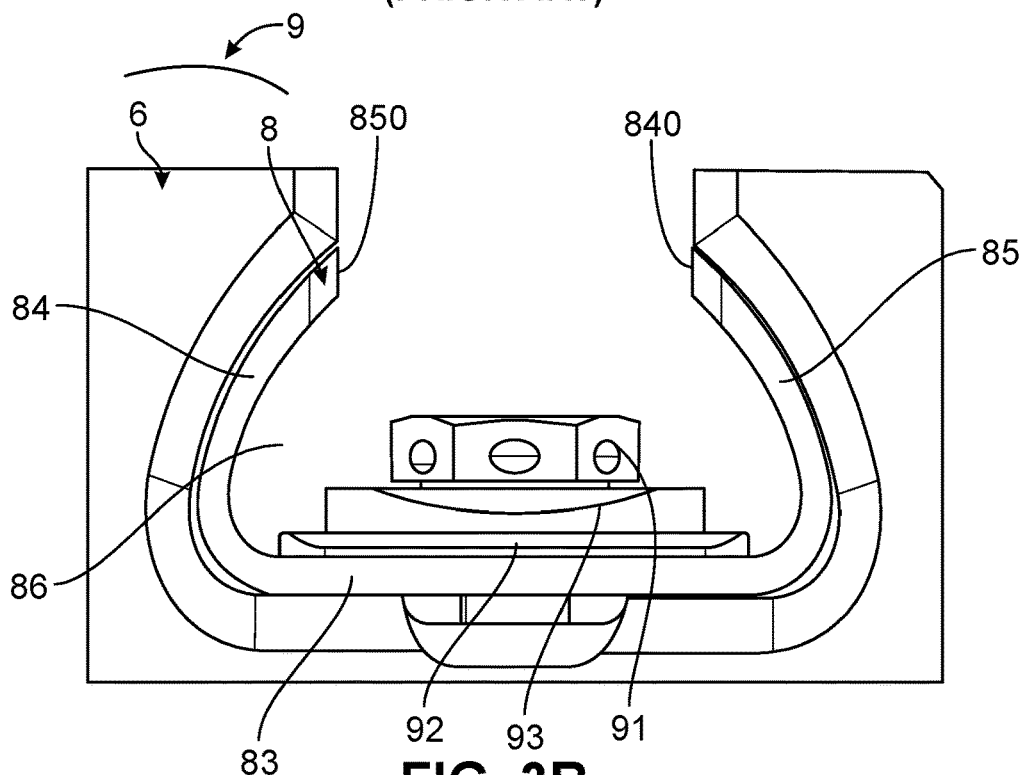
FIG. 3B is a schematic partial front view of the guide assembly in FIG. 3A.

The fastening device 90 can be located upstream of the guide element at the first longitudinal end 81. Preferably, the fastening device 90 is on the bottom wall 83 of the first longitudinal end 81 (as shown in FIG. 3A of the prior art). This fastening device 90 thus allows the guide element 8 and the first element 6 to be secured together.

The fastening device 90 may comprise a screw 91, a wedge 92 and a shouldered ring 93. The shouldered ring 93 can be interposed between a head of the screw 91 and the wedge 92. In the example shown in FIGS. 6 and 8, the shouldered ring 93 extends through the wedge 92, the bottom wall 83 and the bottom 63 to allow a firm attachment between the guide element 8 and the first element 6.

Alternatively (not shown), the fastening device 90 can also be located at the level of the pair of gripping tongues 80 in the guide assembly 1 of the first embodiment. In this case, the fastening device 90 can comprise the screw 91, the wedge 92 and the shouldered ring 93 in the configuration shown in FIG. 6, or can be simplified by having only a bolt, for example.

The guide assembly 9 can also move the second element 7 relative to the first element 6 via the guide element 8. To this end, the guide assembly 9 of the first embodiment may comprise the second element 7 (as in the configuration shown in FIG. 1).

The second element 7 can be secured to the external cowl 5.

For example, the second element is the slider (shown in FIG. 1) which is able to move the opening 86 in the guide element 8.

Figure 9:
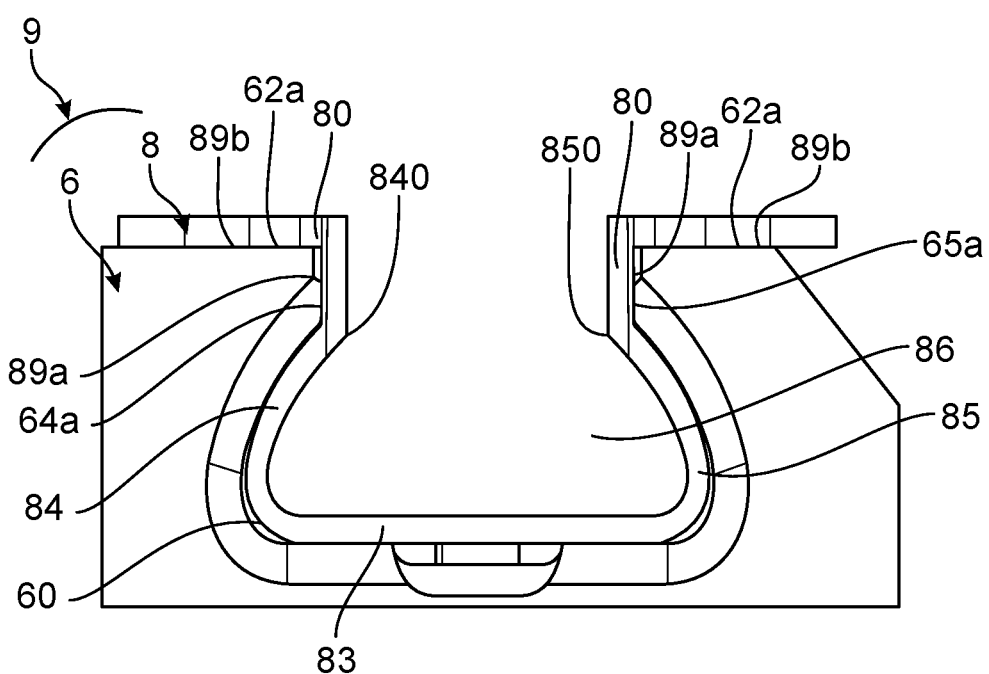
FIG. 9 is a partial schematic front view of the guide assembly of FIG. 4 according to a second embodiment of the present disclosure.

FIG. 9 illustrates a second embodiment of the guide assembly 9 for retaining the guide element 8 on the first element 6.

This guide assembly 9 of the second embodiment differs from the guide assembly 9 of the first embodiment wherein there is no fastening device 90 at the level of the first longitudinal end 81 of the guide element 8.

The fastening device or devices 90 of the second embodiment are preferably located at the level of the pair of gripping tongues 80. In this case, the fastening device 90 may comprise the screw 91, the wedge 92 and the shouldered ring 93 in the configuration shown in FIG. 6 or FIG. 8, or may be simplified by having only a bolt, for example.

FIGS. 10 and 11 illustrate a third embodiment of the guide assembly 9 for retaining the guide element 8 on the first element 6. This guide assembly 9 of the third embodiment differs from the guide assembly 9 of the first and second embodiments by the pair of gripping tongues 80.

In some embodiments of the guide element 8 in FIGS. 10 and 11, the pair of gripping tongues 80 extend substantially in the plane perpendicular to the axis A.

Each gripping tongue 80 comprises a flat segment. This flat segment extends from a corresponding one of the free ends 840, 850 of the first and second lateral walls 84, 85.

Each gripping tongue 80 may comprise the first bearing face 89a which extends substantially in the plane perpendicular to the axis A. This first bearing face 89a has a flat shape in the examples shown in FIGS. 10 and 11. Alternatively (not illustrated), the first bearing faces 89a of the pair of gripping tongues 80 have a curved shape. The curved shape of the first bearing faces 89a comprises a concave portion oriented towards the second bearing surfaces 64a, 65a of the first element 6. In this variant, the second bearing surfaces 64a, 65a of the first element 6 may also have a curved shape, preferably complementary to that of the first bearing faces 89a of the pair of gripping tongues 80.

In a similar manner to the first and second embodiments, when the guide element 8 is installed on the first element 6, the first bearing face 89a of the third embodiment is configured to come into abutment against the corresponding second bearing surface 64a, 65a.

FIG. 10 illustrates holding members 62 of the first element 6 which are similar to those in FIG. 7 (i.e., grooves or recesses of flat shape and extending in a plane parallel to the axis A).

Alternatively, the holding members 62 of FIG. 11 are inclined (or otherwise have a chamfer). In some embodiments, this allows to make it easier to assemble and/or disassemble the pair of gripping tongues 80 without damaging the first element 6. The first bearing surfaces 62a are therefore inclined at an angle α. This angle α is measured between a plane transverse to the axis A and a plane perpendicular to the axis A which passes through the first bearing faces 89a. The angle α can be between 450 and 90°. In the example shown in FIG. 11, the angle α is approximately 60° to form chamfered holding members 62. In the example shown in FIG. 10, the angle α (not shown) is approximately 90° to form holding members 62 in the form of recess or grooves.

With reference to FIGS. 12A, 12B, 13A, 13B, 14 and 15, we will now describe a method for assembling the guide assembly 9 described above.

The assembly method generally comprises the steps of:
(a) providing the first element 6 and the guide element or elements 8 (as described above with reference to FIGS. 6 to 11);
(b) compressing the gripping tongues 80;
(c) translating the guide element 8 in the guide housing 60 of the first element 6 along the axis A; and
(d) releasing (or loosening) the gripping tongues 80 so that each tongue of the pair of gripping tongues 80 cooperates in abutment with the corresponding holding member 62 to retain the guide element 8 on the first element 6.

This assembly method applies to the three embodiments described above.

Figure 12A:
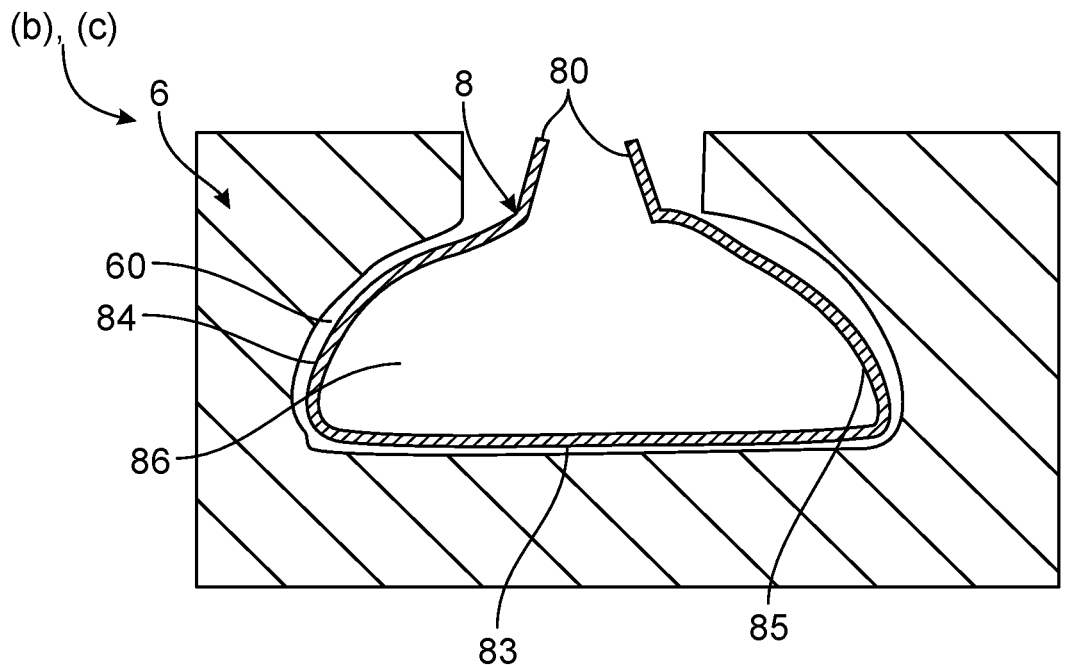
FIG. 12A is a partial schematic cross-sectional view of the compression and translation steps of the gripping tongues of the guide assembly of FIG. 10.
Figure 12B:
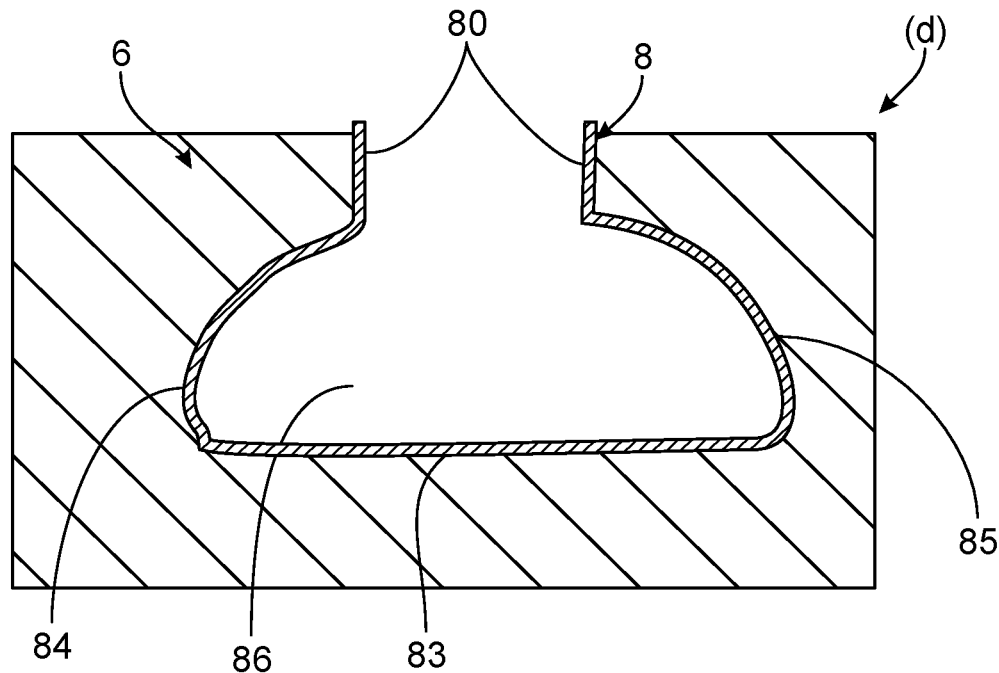
FIG. 12B is a partial schematic cross-sectional view of a step for releasing the gripping tongues of FIG. 12A.

FIGS. 12A and 12B illustrate, by way of example, steps (b) to (d) in the case of the guide assembly 9 according to the third embodiment.

In some embodiments, the compression step (b) allows to bring the gripping tongues 80 towards each other to facilitate the insertion of the guide element 8 into the guide housing 60 of the first element. This allows to reduce the dimension between the lateral walls 84, 85 and facilitates the assembly method.

Step (d) allows the pair of gripping tongues and the lateral walls 84, 85 (and therefore the guide element as a whole) to return to their initial shape before compression in step (b). The state of the guide element 8 before compression (or after step (d)) is referred to as the "resting state". Steps (b) to (d) can be carried out manually by an operator (in some embodiments for assembling the guide assembly 9 of the third embodiment).

Alternatively, steps (b) to (d) can be carried out using one or more suitable toolings T. The tooling T can be a pair of pliers, for example with a knob or circlip. To achieve this, each gripping tongue 80 can comprise at least one orifice 88. The tooling T is adapted to be removably attached in the orifice 88 so as to compress and/or release the pair of gripping tongues 80, one with respect to the other.

Figure 13A:
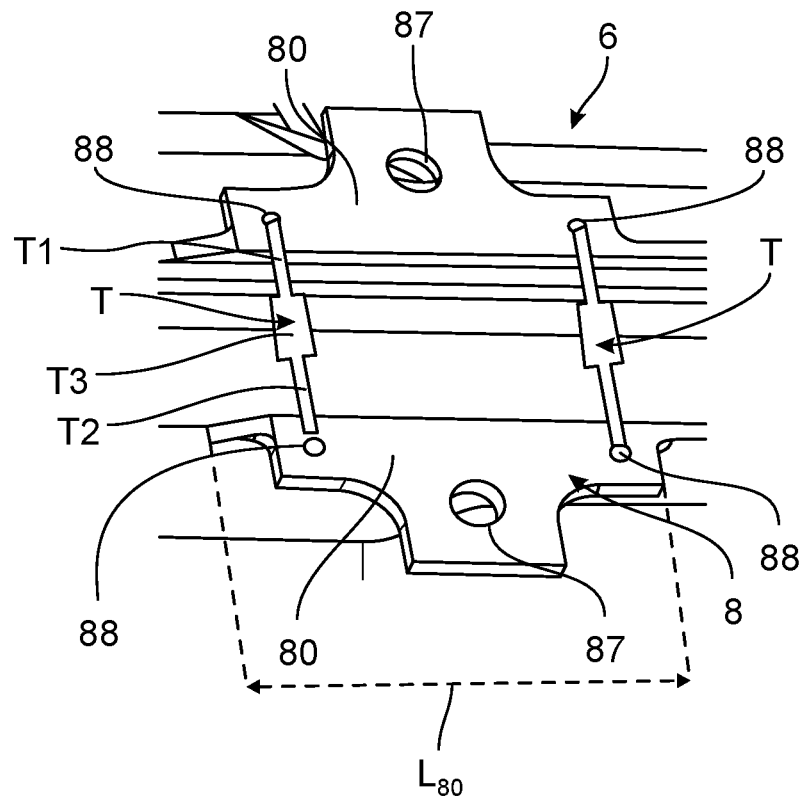
FIG. 13A is a partial schematic perspective view of the guide element of FIG. 6 installed in the first element by a first example of tooling.
Figure 13B:
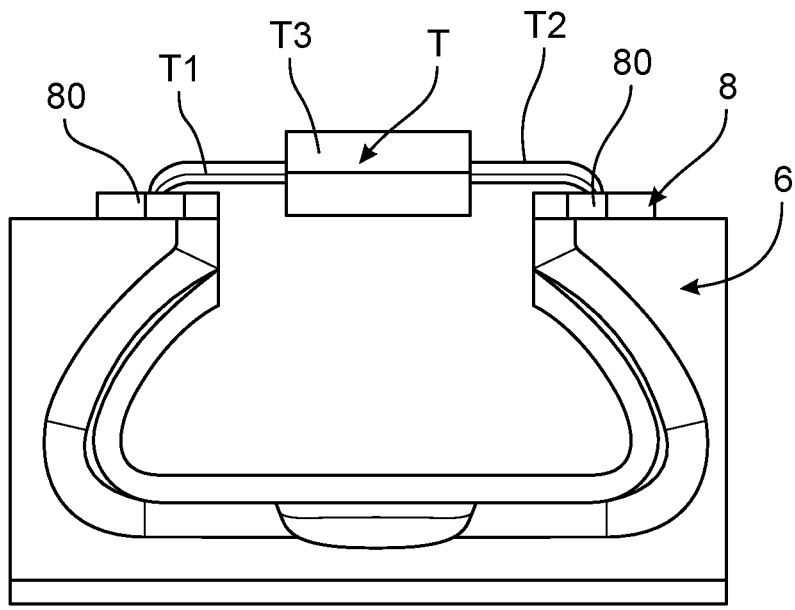
FIG. 13B is a partial schematic front view of FIG. 12A.

FIGS. 13A and 13B illustrate a first example of tooling T for assembling the guide element 8 in the second element 6. Each gripping tongue 80 comprises two orifices 88 located on an upstream end and a downstream end of the gripping tongue 80. The tooling T comprises a first rod T1, a second rod T2 opposite this first rod T1, and a knob T3 connecting the first and second rods T1, T2 together. The first and second rods T1, T2 of the two toolings T are inserted and attached in the orifices 88 at the upstream and downstream ends of the pair of gripping tongues 80. The knob T3 allows to move the gripping tongues 80 towards and/or away from each other. Advantageously, the second rod T2 may comprise an inverted thread to reinforce the action of the knob T3.

Each gripping tongue 80 may also comprise at least one hole 87. In the examples shown in FIGS. 13A, 14 and 15, each tongue 80 comprises one or more holes 87 which are located between the orifices 88 at the upstream and downstream ends of the gripping tongue 80. This hole 87 can be used as the main attachment (as produced by the fastening device 90 shown in FIGS. 6 and 8) for the guide element 8 on the first element 6.

Figure 14:
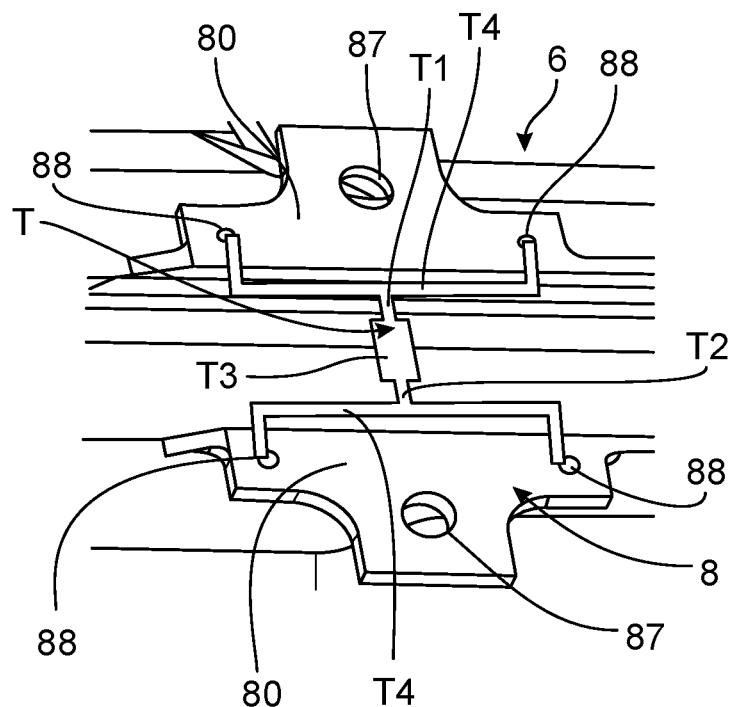
FIG. 14 is a partial schematic perspective view of the guide element of FIG. 6 installed in the first element by a second example of tooling.

FIG. 14 illustrates a second example of tooling T for assembling the guide element 8 in the second element 6. The tooling T of the second example differs from the tooling T of the first example by the presence of a single knob T3 which connects the first and second rods T1, T2. Each of these first and second rods T1, T2 is connected to a third rod T3 which is inserted and attached in both the orifices 88 in the upstream and downstream ends of the corresponding tongue of the pair of gripping tongues 80.

Figure 15:
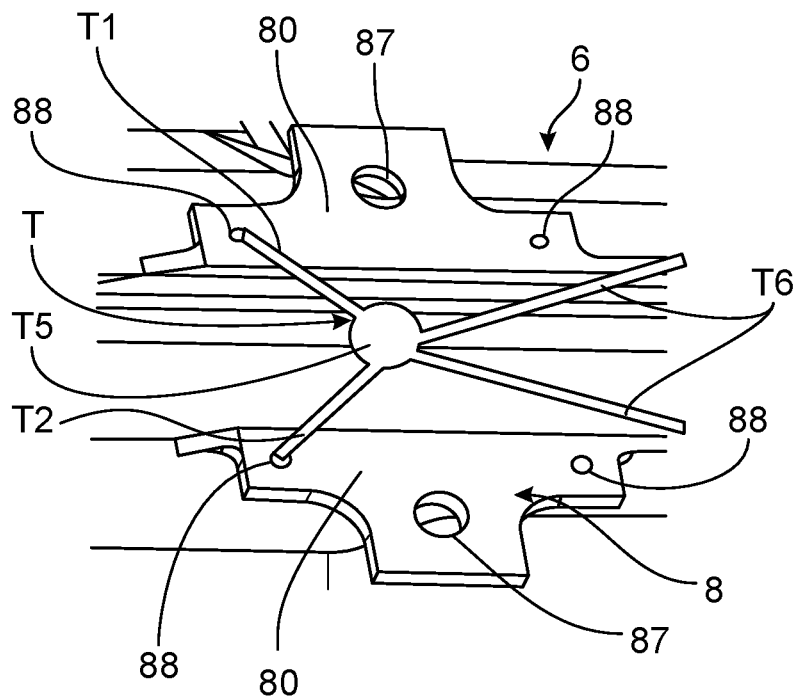
FIG. 15 is a schematic partial perspective view of the guide element of FIG. 6 installed in the first element by a third example of tooling.

FIG. 15 illustrates a third example of tooling T for assembling the guide element 8 in the first element 6. The tooling T of the third example also comprises first and second rods T1, T2 connected together by a plier T5. Fourth rods T6 are also connected to the plier T5 so that this plier T5 can be actuated and the gripping tongues 80 moved towards and/or away from each other.

The toolings T shown in FIGS. 13A, 13B, 14 and 15 can also be used to disassemble the guide element 8 from the first element 6.

After step (d), the assembly method may further comprise a further step (e) of adding at least one fastening device 90 to at least one of the first 81 and second 82 longitudinal ends of the guide element and/or to the pair of gripping tongues 80.

In some embodiments, the assembly method comprises a further step (f) of inserting the second element 7 at least partly into the opening 86 of the guide element 8, for example by translation.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A guide assembly for an aircraft propulsion unit, the guide assembly comprising:
  a first element having holding members; and
  a guide element attached to the first element, the guide element having a generally elongated shape along a longitudinal axis between a first longitudinal end and a second longitudinal end, the guide element comprising:
    a bottom wall;
    two lateral walls connected together by the bottom wall; and
    an opening delimited between the bottom wall and the lateral walls, the opening configured to receive at least partly a second element configured to move relative to the guide element, wherein the guide element further comprises at least one pair of gripping tongues cooperating with the holding members of the first element to retain the guide element on the first element, wherein the holding members are grooves, each groove receiving a tongue of the at least one pair of gripping tongues of the guide element, wherein the guide assembly further comprises at least one fastening device being fixed to at least one of the first and second longitudinal ends of the guide element and/or on the at least one pair of gripping tongues, wherein the at least one fastening device is configured to secure the guide element to the first element, and wherein the at least one fastening device comprises a screw, a wedge, and a shouldered ring interposed between a head of the screw and the wedge.

2. The guide assembly of claim 1, wherein the at least one pair of gripping tongues extend substantially in a plane parallel to the longitudinal axis or in a plane perpendicular to the longitudinal axis.

3. The guide assembly of claim 1, wherein tongues of the at least one pair of gripping tongues and the lateral walls are elastically deformable between a first position, in which the tongues and the lateral walls are brought together, and a second position, in which the tongues cooperate with the holding members to retain the guide element on the first element.

4. The guide assembly of claim 1, wherein the at least one pair of gripping tongues extend outwardly from a free end of the lateral walls.

5. The guide assembly of claim 1, wherein the guide assembly comprises several pairs of gripping tongues distributed regularly along the longitudinal axis.

6. The guide assembly of claim 1, wherein each tongue of the at least one pair of gripping tongues comprises at least one L-shaped curved segment.

7. The guide assembly of claim 1, wherein the first element comprises at least one pair of bearing surfaces complementary to corresponding bearing faces of the at least one pair of gripping tongues.

8. The guide assembly of claim 1, wherein each tongue of the at least one pair of gripping tongues has a first length measured along the longitudinal axis, the first length being between 3 cm and 10 cm with respect to a second length of 100 cm of the guide element.

9. The guide assembly of claim 1, wherein each tongue of the at least one pair of gripping tongues has a width measured within a plane perpendicular to the longitudinal axis, and wherein the width is between 30% and 70% with respect to a total width of the bottom wall.

10. A thrust reverser for a nacelle of an aircraft propulsion unit, the thrust reverser comprising:
at least one external cowl movable between a thrust reverser closed position and a thrust reverser open position; and
a front frame,
wherein the at least one external cowl is mounted to be translationally movable along at least one guide assembly according to claim 1.

11. The guide assembly of claim 1, wherein the guide element is a rail.

12. The guide assembly of claim 1, wherein the first element is a stationary beam.

13. The guide assembly of claim 1, wherein the guide assembly comprises the second element which is assembled at least partly in the opening of the guide element so that the second element moves relative to the guide element.

14. The guide assembly of claim 13, wherein the second element is a slider.

15. A method for assembling a guide assembly for an aircraft propulsion unit,
the guide assembly comprising:
a first element having holding members; and
a guide element attached to the first element, the guide element having a generally elongated shape along a longitudinal axis between a first longitudinal end and a second longitudinal end, the guide element comprising:
a bottom wall;
two lateral walls connected together by the bottom wall; and
an opening delimited between the bottom wall and the lateral walls, the opening configured to receive at least partly a second element configured to move relative to the guide element,
wherein the guide element further comprises at least one pair of gripping tongues cooperating with the holding members of the first element to retain the guide element on the first element, and
wherein the holding members are grooves, each groove receiving a tongue of the at least one pair of gripping tongues of the guide element,
the method comprising:
providing the first element and the guide element;
compressing the gripping tongues of the guide element;
translating the guide element in a guide housing of the first element along the longitudinal axis; and
releasing the gripping tongues so that each tongue of the at least one pair of gripping tongues cooperates in abutment with the corresponding holding member to retain the guide element on the first element.

16. The method of claim 15, wherein providing the first element and the guide element, compressing the gripping tongues of the guide element, and translating the guide element in a guide housing of the first element along the longitudinal axis are carried out using a suitable tooling, the tooling being chosen from a knob and circlip pliers.

17. The method of claim 16, wherein each tongue of the at least one pair of gripping tongues comprises at least one orifice, the tooling being configured to be removably attached in the at least one orifice in order to compress and/or release the pair of gripping tongues, one with respect to the other.

* * * * *